(No Model.) 4 Sheets—Sheet 2.

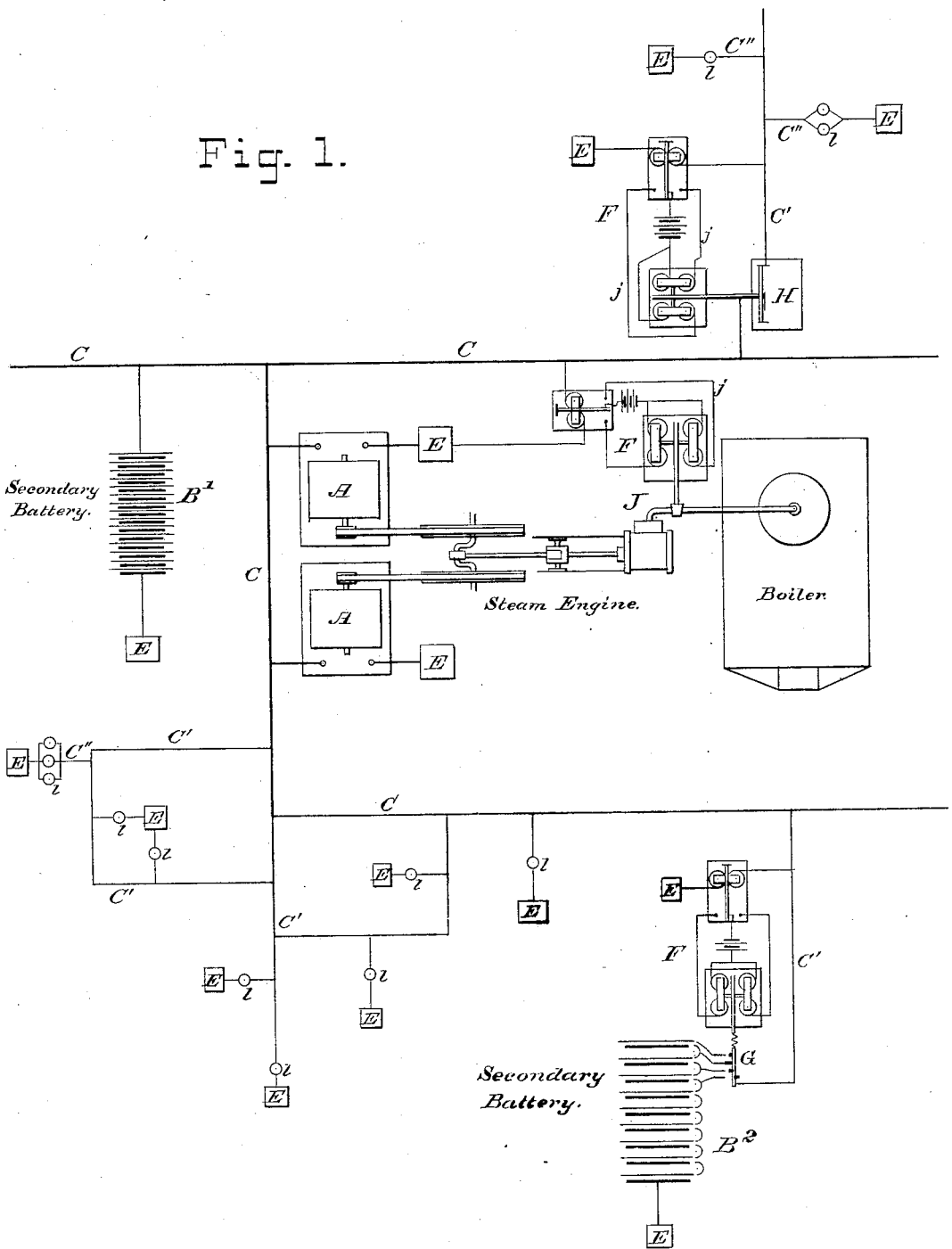

ST. G. L. FOX.
DISTRIBUTION OF ENERGY BY ELECTRICITY.

No. 254,948. Patented Mar. 14, 1882.

ATTEST:
R. Connett.
Geo Bainton

INVENTOR:
St. George Lane Fox,
by his Atty's
Burke, Fraser & Connett.

N. PETERS, Photo-Lithographer, Washington, D. C.

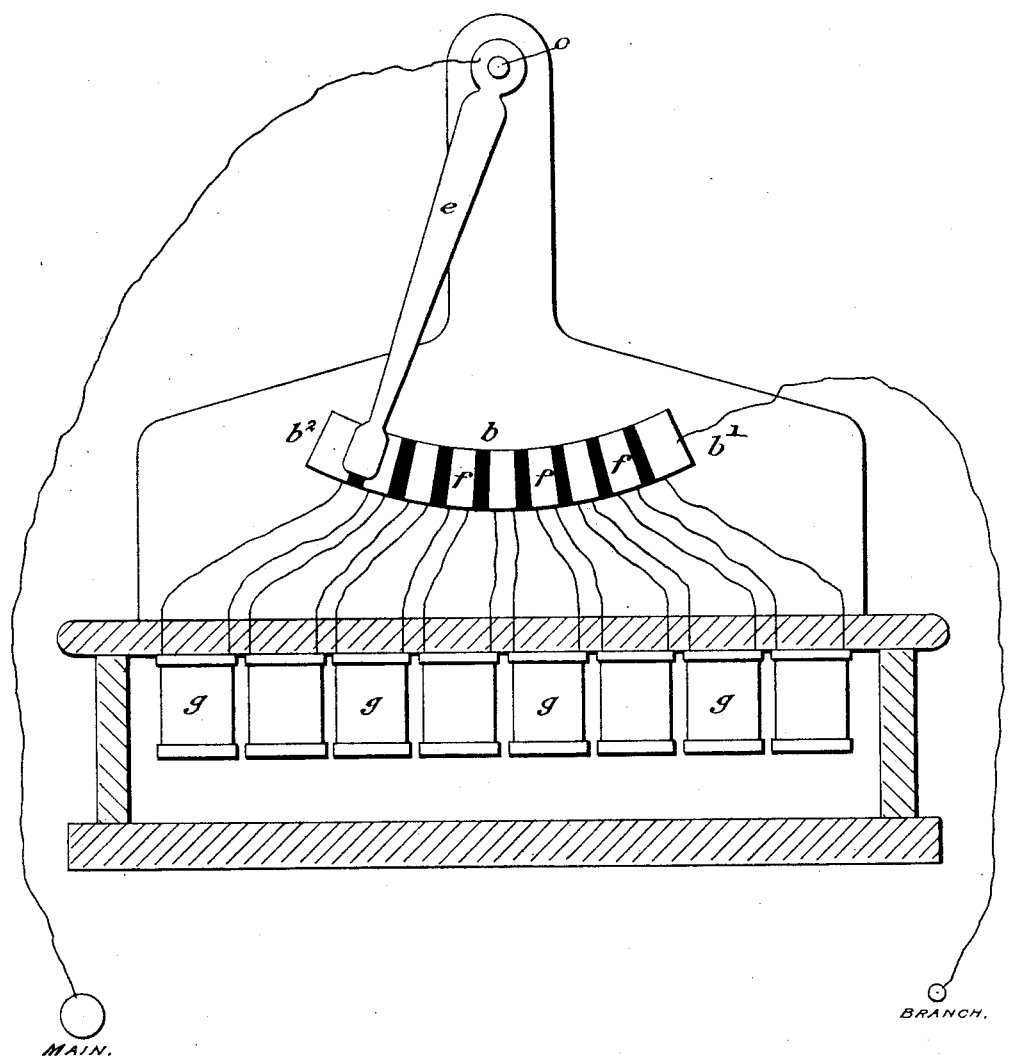

(No Model.) 4 Sheets—Sheet 4.
ST. G. L. FOX.
DISTRIBUTION OF ENERGY BY ELECTRICITY.
No. 254,948. Patented Mar. 14, 1882.
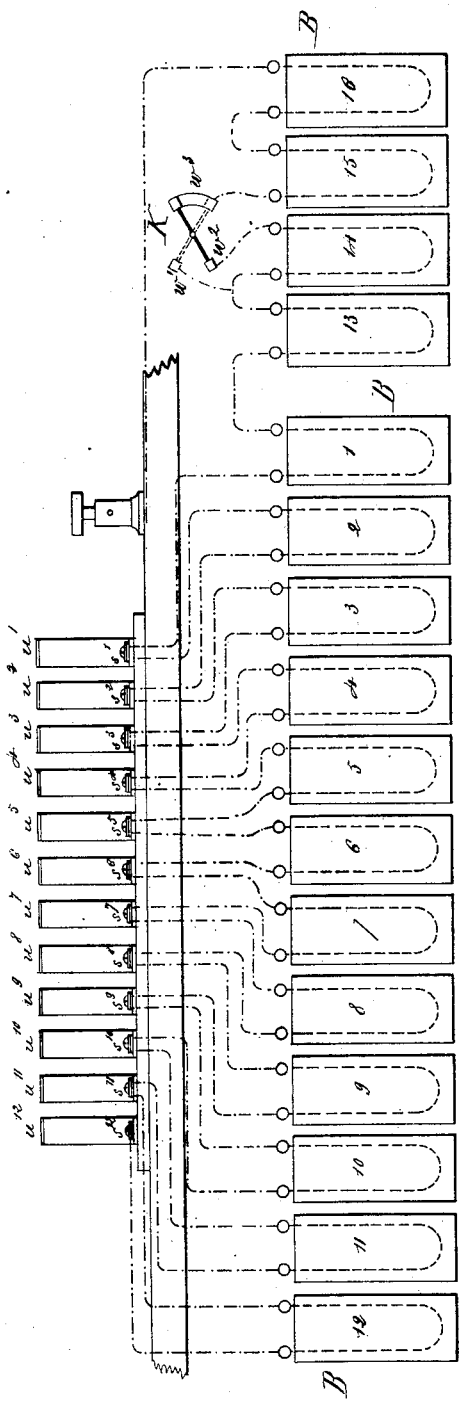
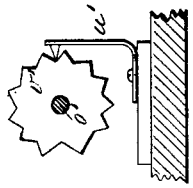
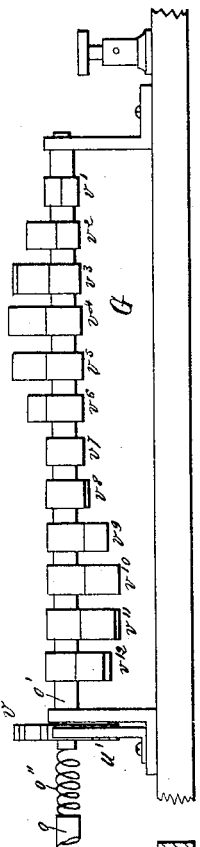
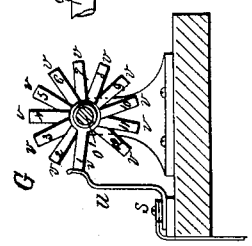
WITNESSES
INVENTOR:
St George Lane Fox
By his Attorneys,
Burke, Fraser & Connett

UNITED STATES PATENT OFFICE.

ST. GEORGE LANE FOX, OF LONDON, ENGLAND.

DISTRIBUTION OF ENERGY BY ELECTRICITY.

SPECIFICATION forming part of Letters Patent No. 254,948, dated March 14, 1882.

Application filed January 13, 1881. (No model.) Patented in England October 9, 1878, October 12, 1878, and November 11, 1878, in France October 23, 1878, and in Belgium October 30, 1878.

*To all whom it may concern:*

Be it known that I, ST. GEORGE LANE FOX, of London, England, have invented certain Improvements in the Distribution of Energy by Electricity for Lighting and other Purposes, of which the following is a specification.

My invention has reference to a system whereby energy for the general purposes of lighting, heating, or the development of motive power is transmitted by means of electric currents from any point or station where energy is developed to a town, district, or building for distribution as required. The electric currents may be produced by chemical action, as in a battery, or by mechanical power, as in a dynamo-electric machine, or otherwise.

My invention and the ordinary system of distribution to which it relates will be best understood by reference to the accompanying drawings, in which—

Figure 3:
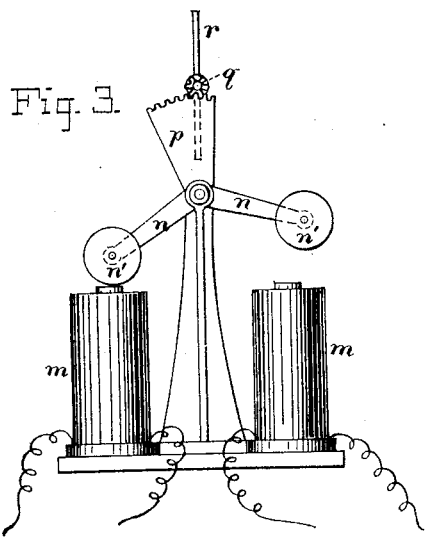
Figure 4:
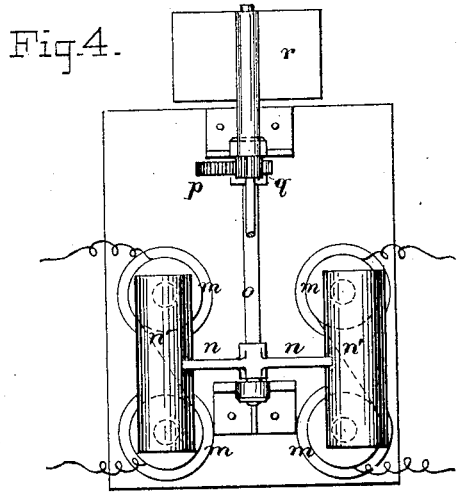
Figure 2:
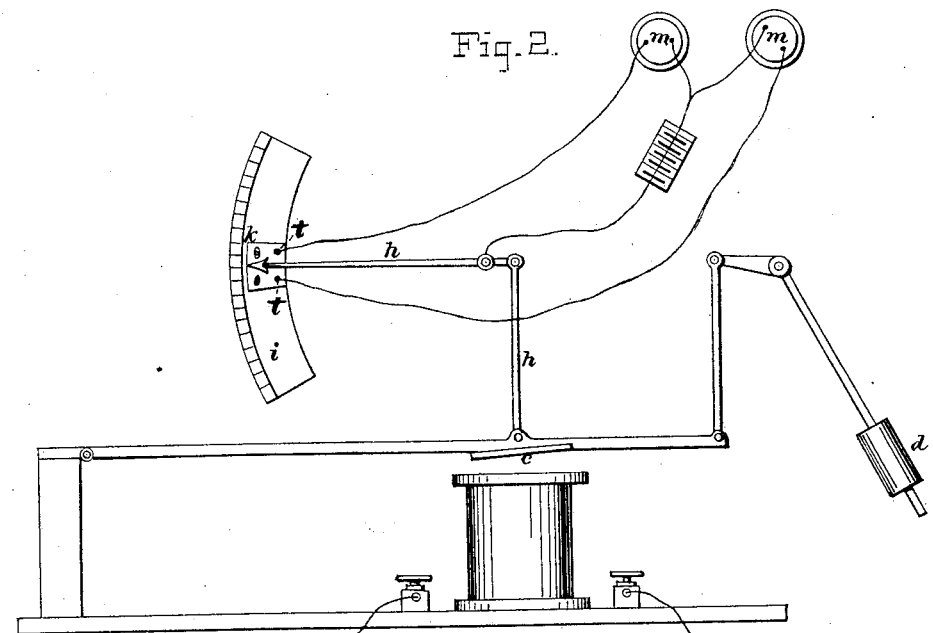

Figure 1 is a diagram illustrating one arrangement of circuits and the electrical and other appliances connected therewith in accordance with my invention. Fig. 2 is a detailed view of my electrometer. Figs. 3 and 4 show a portion thereof in elevation and plan. Fig. 5 is a front elevation of a rheostat, partly in vertical section; and Fig. 6 is a side elevation of a secondary battery and connections with a commutator, of which Fig. 7 is a fragmentary elevation. Fig. 8 is a transverse section, and Fig. 9 is an end elevation.

Referring principally to Fig. 1, let A A designate generators of the electric current, which may be batteries, but which I will assume to be dynamo-electric machines driven by suitable power.

From the generators one or more insulated conductors lead to the point or to the several points where the electric energy is to be utilized, being branched and sub-branched, as may be necessary to the desired distribution of the current. To these conductors, lettered C C, which I call "electric mains," and which may be insulated and laid in the ground, the anode of each generator A is connected, and its cathode is connected to earth, or vice versa. The conductors C C will usually have conducting branches or sub-mains C' C' leading from them in various directions, and numerous other branches or sub-branches, C" C", will lead from either the mains C or the sub-mains C' to the several electric lamps or other devices, $l\ l$, to be acted on by the electric current, each branch C" being joined to one pole thereof, and the other pole thereof being connected to earth.

The action of the generator or generators is to charge the mains and their branches with electric potential, which overcomes the resistance opposed by the devices $l\ l$, and escapes to the earth in the form of electric currents. The mains C C should be as large as practicable, in order to reduce as much as possible their resistance to the current, and to prevent inequality in the electric potential, and the size of the sub mains and branches should or may be proportioned to the amount of electricity to be conveyed through them. E E designate the several earth-plates or earth-connections.

In applying my system to electric lighting, the lamps are worked in multiple arc, and the light is produced by the incandescence of a suitable refractory material within the lamp, forming part of the electrical communication between the main and earth. I prefer the employment of the earth as a return-conductor, as thereby all resistance is avoided and expense is saved.

The electro-motive force supplied to the mains should be kept as nearly as possible constant at, for instance, one hundred volts or British association units, or more, if desirable, and the insulation will permit. To insure this result I provide an automatically-operated governor for the generators, which I will now describe, referring to Figs. 1 and 2.

A branch conductor leads from one of the mains C to earth, and includes an electro-magnet, $a$, whose armature $c$ is mounted on a lever, which is connected by a link to another lever, $d$, which bears a weight on its long arm, or is acted on by any other force tending to draw the armature from the magnet. This retractile tendency varies with the position of the armature, being least when it is drawn fully away from the magnet, and greatest when the armature is attracted close to the magnet.

The core of the magnet $a$ is magnetized to a degree proportioned to and varying with the potential in the main at the point where its branch is connected, and on any change of magnetization the armature is attracted with greater or less force, and moves toward or from the magnet till it reaches a position of equilibrium, where the magnetic attraction and the retracting force balance each other. Thus the position of the armature is an index of the potential in the mains. This movement is multiplied in a contact-lever, $h$, whose short arm is connected by a link with the armature-lever, and whose long arm stands over a graduated arc, $i$, along which it moves. This instrument I term an "electrometer" or "electro-dynamometer." It is shown at F in Fig. 1.

To the arc $i$ is fixed adjustably a sliding plate, $k$, bearing two contact stops or pins, $t\ t$, one on each side of the lever $h$. Each pin $t$ forms one terminal of a local circuit, $j$, whose other terminal is the lever $h$, thereby making the electro-dynamometer also a double-acting relay. The circuits $j$ each include an electro-magnet, $m$, and each is furnished with a source of the electric current. When the potential in the main falls below a certain limit the lever $h$ touches one of the pins $t$, closes one of the circuits $j$, and excites one of the magnets $m$. When the potential rises beyond a certain limit the contrary results ensue, and the other magnet $m$ is excited. The magnets $m\ m$ are arranged to act in contrary directions on a lever or levers, which are connected with a valve in the pipe supplying steam to the engine which runs the generators A A, so that as the potential rises the supply of steam is reduced, and as it falls said supply is increased. This connection may be made in any desired way— for instance, by the way shown at J in Fig. 1. Instead of controlling the action of the generators by moving a valve, other means may be employed therefor. One manner in which the magnets $m\ m$ may be made to operate the levers is represented in elevation in Fig. 3 and in plan in Fig. 4.

$m\ m$ are the electro-magnets; $n\ n$, a pair of levers connected to the armatures $n'\ n'$, and fixed to a rocking shaft, $o$, which works the steam-valve.

To the shaft $o$ is keyed a toothed sector, $p$, in gear with a pinion, $q$, on whose spindle is a fan, $r$. As the armature of one or other of the levers $n$ is attracted by the corresponding magnet $m$ the shaft $o$, in rocking, has to move the sector $p$, pinion $q$, and fan $r$, and as the fan must make several revolutions before the armature can come in contact with the magnet the resistance of the air retards the action and prevents too sudden a movement. I also provide means for controlling the supply of potential from the main conductors to the sub mains or branches, in order that the charge of potential in said sub mains or branches may remain uniform irrespective of any probable variations in the charge in the mains, and of any probable variations in the resistance in the sub mains or branches by more or less devices $l\ l$ being put into circuit therewith. This result I accomplish by introducing a rheostat or variable resistance, H, Fig. 1, into the sub main or branch at or near its junction with the main conductor, the rheostat being operated by an electrometer, F, such as hereinbefore described.

One form of rheostat is shown in Fig. 5, the shaft $o$ being the same as is shown in Figs. 3 and 4. On it is fixed a spring, $e$, which is in electrical connection with the main. The end of this spring presses against a board, $b$, along which it moves according as the shaft $o$ oscillates. The board $b$ has a number of conducting-strips, $f\ f$, insulated from each other, and connected with corresponding resistances, $g\ g$. When the spring $e$ is at the end $b'$ of the board the current passes directly from the main to the sub main or branch; but as the spring moves toward the end $b^2$ the resistances $g\ g$ are successively brought into circuit. As the resistance at $l\ l$ in the branch decreases, or as the charge of potential in the main decreases, the spring $e$ moves toward the end $b'$ of the board, and thereby reduces the resistance in the branch sufficiently to keep the charge of potential therein at the desired point.

Instead of working through the instrumentality of the magnets $m\ m$, the rheostat may consist of a vessel containing a conducting-fluid—such as mercury—either fixed to the armature $c$ or connected thereto by levers. The plates of a resistance-coil dip into the mercury, and more or less of these plates are immersed according to the height of the armature, and therefore of the mercury.

The electrometer-magnet $a$ is arranged in a branch leading to earth, and tapping the sub main or branch at some point between the rheostat and the devices $l\ l$, as shown in Fig. 1. By this means the portion of current required to work the magnet is diverted from the main conductor, and does not also supply the devices $l\ l$, so that a fine wire may be used for the coil of the magnet, and numerous turns be brought within its magnetic field, thereby rendering the magnet exquisitely sensitive to current fluctuations. In case of any increase of resistance at the devices $l\ l$, the current thereto is decreased, and a greater proportion of current is deflected to the magnet, thereby increasing its attractive power.

Prior to my invention the electro-magnet designed to operate a rheostat, and thereby govern an electric current, has been placed in the circuit whose current it was to govern, so that the entire current necessarily passed through its coil, which, to avoid undue loss by resistance, is made of coarse wire, so that but few turns can be brought within the magnetic field, and the magnet is not sensitive to minute fluctuations in the current. Thus arranged, in case of any increase of resistance at the devices $l\ l$ the current is decreased, and the attractive power of the magnet is decreased instead of being increased, as with my arrangement.

In Fig. 1, B' B² are secondary or reservoir batteries, which I employ in connection with the conducting mains or branches to absorb and store up any excess of potential, that the latter may be returned to the conductors in case of any reduction of the charge therein below the normal. These secondary batteries are preferably Planté's lead and sulphuric-acid batteries with their cells joined in series, the cells having a large conducting-surface. There should be several batteries arranged in branches leading from the conducting-mains at various points and terminating in earth. The simplest arrangement of those is shown at B' in Fig. 1, the opposite electrodes of the battery being connected with the main and with earth. Thus arranged it may be charged by increasing the electro-motive force during the hours when there is but little consumption of the electric energy, so that the potential will remain stored up in it until such time as the charge in the mains falls owing to the increased draft upon it, whereupon the absorbed potential will be returned to the mains when it is most needed. The number of cells necessary in each secondary battery will depend on the normal charge of potential in the mains.

Another arrangement of the secondary battery is shown at B² in Fig. 1, and also more in detail in Figs. 6 to 9. A commutator, G, is connected with the battery in such manner, as hereinafter explained, that the battery in discharging will automatically adapt the potential of its discharge to the needs of the mains, as determined by the variations in the electrometer F, before described, and to charge the battery it is not necessary to increase the electro-motive force in the mains. Suppose the electro-motive charge in the mains to be equal to that of fifty cells of the secondary battery when charged, and the battery to consist of fifty cells, no current will pass from the mains through the battery to charge it unless the electro-motive charge in the mains be increased or the number of cells in series be diminished.

In charging the battery it is desirable that as many cells as possible be connected in series, so that the electro-motive charge of the battery will be just inferior to that of the mains. So in order to charge the battery I provide a commutator, K, Fig. 6, which will shunt or cut out one of the cells of the battery, leaving the remaining forty-nine in series, through which number a current from the main will pass and charge the battery, its superior force of one cell overcoming the resistance of the battery. The cell thus cut out should be changed from time to time, so as to equalize the charge in all the cells, and for this purpose I provide a commutator, K, to each cell of the battery.

I will now more particularly describe the construction of the commutators and their connection with the battery, reference being had to Figs. 6 to 9.

B is the secondary battery, having cells 1, 2, 3, &c., up to, for example, 50, although only sixteen are shown. The first twelve of these cells, numbered 1 to 12, are connected with the commutator G, the remaining cells being simply connected with each other in series. The cells 1 to 12 are connected to each other in series, the connections passing through studs $s\ s$, numbered $s'$ to $s^{12}$, corresponding to the cells, and to each stud is connected a contact-spring, $u$, marked $u'$ to $u^{12}$ to correspond with the studs. A conducting-shaft, $o'$, mounted in rotary bearings, has twelve radial conducting-arms, $v'$ to $v^{12}$, respectively, each of which is arranged opposite the like-numbered spring $u$, as shown in Fig. 7, and each is set in advance of the next, as shown in Fig. 8, so that but one can touch its spring $v$ at a time. The shaft $o'$ is connected by a spring, $o''$, or otherwise, to the shaft $o$ of the electrometer F, before described, which turns back or forth as the potential in the mains increases or diminishes, and thereby turns the shaft $o'$. When the potential in the mains is high the shaft $o'$ is in the position shown in Fig. 8, with the arm $v'$ in contact with the spring $u'$, so that cells 2 to 12 are cut out, and only cell 1 and the thirty-eight cells not controlled by the commutator are permitted to discharge; but when the potential becomes lower the shaft $o'$ turns a little and brings one or other of the arms $v$ (depending on the potential of the current) into contact with the corresponding spring $u$—say, for instance, $v^5$ with $u^5$, when only cells 6 to 12 are cut out and the remaining cells discharge. At each fluctuation in the potential the commutator is shifted, so as to compensate therefor as nearly as possible. To insure against the shaft $o'$ being moved until one arm $v$ has broken contact with its spring $u$, and the succeeding arm has not yet touched its spring, and then stopping, thereby breaking the circuit, I provide the shaft $o'$ with a notched disk, $v'$, engaging with the point on a fixed spring, $u'$. When the shaft $o$ begins to turn the shaft $o'$ is held stationary until the tension of the spring $o''$ overcomes the resistance of the spring $u'$, when the shaft $o'$ turns suddenly until the spring $u'$ engages the next notch.

The commutator K consists only of a switch-lever to be operated by the hand, having three contacts, $w'$, $w^2$, and $w^3$. These are shown as connected respectively to cells 13, 14, and 15, so that when in the position shown in full lines cells 14 and 15 are connected, but when moved to the position shown in dotted lines cells 13 and 15 are connected directly and cell 14 is cut out.

I make no specific claim in this application to the construction of commutators shown in Figs. 6 to 9, reserving such claim for a future application.

I claim as my invention—

1. The combination of an electric circuit divided into branches, a continuous-current generator arranged in the undivided portion thereof, a number of electric lamps arranged in said branches in multiple arc, and a secondary battery arranged in a branch by itself, whereby when the generator is supplying more electro-motive force than is required by the lamps the excess may develop a charging-current through the secondary battery, and when the potential in the circuit falls below the normal the secondary battery may discharge and supply a current to the lamps, re-enforcing that from the generator, substantially as set forth.

2. The combination of a continuous-current generator, an earth-connection with one electrode thereof, a conductor leading from the other electrode thereof, a number of branches from said conductor to earth, a number of electric lamps arranged in said branches in multiple arc, and a secondary battery arranged by itself in one of said branches and consisting of secondary cells coupled in series, substantially as and for the purposes set forth.

3. The combination of an electric-current generator, a conductor leading from one electrode thereof to the point or points where the current is to be used, an earth-connection with said point or each of said points, a compound secondary battery, one of whose electrodes is in connection with one electrode of the generator, and the other of whose electrodes is in connection with the earth, and commutators in connection therewith, constructed to operate substantially as set forth, whereby any one or more of the cells of the secondary battery may be cut out or replaced while the battery is being charged.

4. The combination of a continuous-current generator, a conductor leading therefrom to the point or points where the current is to be used, an earth connection with said point or each of said points, a compound secondary battery, one of whose electrodes is in connection with one electrode of the generator, and the other of whose electrodes is in connection with earth, a commutator in connection with said battery, an electro-magnetically-operated regulator in connection with said commutator, and means, substantially as herein set forth, interposed between said regulator and said commutator, whereby one or more of the battery-cells are automatically cut out and replaced, according to the varying intensity of the current, all substantially as herein described.

5. The combination of a current-generator, an earth-connection with one electrode thereof, a conducting-main leading from the other electrode thereof, a branch from said main, including a rheostat and a device to be acted on by the electric current and terminating in earth, a sub-branch leading from said branch between said rheostat and earth, including an electro magnet, and also terminating in earth, and means, substantially as hereinbefore set forth, interposed between the armature of said electro-magnet and said rheostat, whereby more or less resistance is interposed in said branch, according as the charge of potential in said sub-branch becomes greater or less than normal.

6. The combination of a generator, an earth-connection with one electrode thereof, conducting mains or branches leading from the other electrode thereof to the several devices to be acted on by the electric current and thence to earth, an electro-magnetically-controlled variable rheostat interposed in one of the said branches, a sub-branch leading from said branch between said rheostat and earth, including the electro-magnet controlling said rheostat and terminating in earth, and a branch leading from either of said conducting mains or branches, except from between said rheostat and earth, including a secondary or reservoir battery, and also terminating in earth, substantially as and for the purposes set forth.

7. The combination of an electro-magnet, its armature, means for exerting a variable retractile force applied thereto, which force shall be greatest when the armature is attracted close to the magnet, and which shall decrease as it is drawn away therefrom, a contact-lever connected to and receiving motion from said armature, an arc along which said lever may move, and a pair of contact-stops arranged one on each side of said lever and capable of being adjusted or set to different positions along said arc, substantially as set forth.

8. The combination of electro-magnets $m\ m$, their armatures $n'\ n'$, connected together substantially as shown, whereby when one armature approaches its magnet the other recedes from its magnet, rock-shaft $o$, receiving motion from said armatures, and retarding-fan $r$, actuated by said shaft, substantially as set forth.

In witness whereof I have hereunto signed my name in the presence of two subscribing witnesses.

ST. G. LANE FOX.

Witnesses:
I. C. MEWBURN,
GEO. C. BACON.